US012154388B1

(12) United States Patent
Shiu et al.

(10) Patent No.: US 12,154,388 B1
(45) Date of Patent: Nov. 26, 2024

(54) FLEET ROUTING MAINTENANCE SYSTEM AND METHOD

(71) Applicant: Zum Services, Inc., Redwood City, CA (US)

(72) Inventors: Melissa Shiu, San Francisco, CA (US); Ivan Vasilko, Redwood City, CA (US); Sidi Liu, Campbell, CA (US); Lipi Sanghi, Sunnyvale, CA (US); Andrew Mormysh, Redwood City, CA (US); Abhishek Garg, Los Altos, CA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 18/661,082

(22) Filed: May 10, 2024

(51) Int. Cl.
*G07C 5/00* (2006.01)
*G07C 5/08* (2006.01)

(52) U.S. Cl.
CPC ............ *G07C 5/008* (2013.01); *G07C 5/006* (2013.01); *G07C 5/0808* (2013.01)

(58) Field of Classification Search
CPC ....... G07C 5/008; G07C 5/006; G07C 5/0808
See application file for complete search history.

(56) References Cited

U.S. PATENT DOCUMENTS 10,096,176 B1 * 10/2018 Namineni .............. G07C 5/008

* cited by examiner

*Primary Examiner* — Michael V Kerrigan
(74) *Attorney, Agent, or Firm* — Kilpatrick Townsend & Stockton LLP

(57) ABSTRACT

A system and method that includes a server computer which receives one or more vehicle inspection results including at least one of: an issue notification identifying an issue with an interior or exterior component of a vehicle or a driver certification that a vehicle is operable. If an issue notification is received, then a report of the issue is transmitted from the server computer to a maintenance information device and, in response, a maintenance certification that the vehicle is operable is received by the server computer from the maintenance information device. Responsive to receiving the driver certification or the maintenance certification, the server computer automatically selects the associated vehicle for a particular route service and the vehicle is assigned to perform the particular route service based on a request received by the server computer.

20 Claims, 5 Drawing Sheets

FLEET ROUTING MAINTENANCE SYSTEM AND METHOD

CROSS-REFERENCES TO RELATED APPLICATIONS

None.

TECHNICAL FIELD

The present application discloses systems and methods for maintaining a fleet of vehicles in a manner that supports scheduled ride service and routing in terms of ensuring that safe and maintained vehicles are available to provide scheduled ride services.

BACKGROUND

Today, massive fleets of vehicles are owned by both governmental and private institutions to facilitate the transport of goods and passengers, which is a major logistics endeavor. Fleet vehicles may have routes which are traveled on a periodic basis to serve customers in various capacities. For example, mail is delivered to virtually every home in the United States on a daily basis by mail carriers in individual trucks. Other private mail companies and goods delivery companies also have fleets of trucks to provide mail service for individual customers. Similarly, local governmental entities operate bus lines for mass transit of passengers, typically in and out of big cities. Public bus lines, for example, use main routes with spurs that serve residential areas of a city to facilitate passengers traveling into and out from the city on a daily basis. Both public and private schools operate bus lines to safely transport children to and from school on a daily basis. School buses, however, usually operate based on stopping at certain places at certain times to safely load children to attend local schools and, for that reason, travel routes that are based on where children live, generally speaking.

Logistics for these fleets are incredibly complex. Maintenance, location, routing, fueling, and driver support are also considerations for fleet vehicles in order to deliver passengers or goods to a particular place by a particular time. In the context of school buses, a bus may be late because of a breakdown, construction delays, fuel problems, or a missing driver which may cause a child to be late for school. Further, school buses may serve redundant routes, which could be accommodated by a single bus, which increases the relative costs of providing bus services on virtually a daily basis.

The maintenance component of managing fleet logistics is a significant element of fleet management. Simply put, no ride services or delivery of goods can be performed when a vehicle is not functional or even not safe to drive. Maintenance must be an ongoing consideration in a fleet of vehicles. Typically, in order to manage maintenance, vehicles are on an assigned schedule where maintenance personnel perform basic maintenance and basic surveys of a particular vehicle. For example, an oil change for a particular vehicle may be required every 3 months, at which time a maintenance technician is scheduled to change the oil and do a basic survey of the particular vehicle. At the same time, the vehicle is necessary, and a significant asset, for performing ride services or delivering goods and the prospect of having a vehicle unavailable to perform one or more ride services or deliver goods, may significantly stress fleet logistics or leave potential customers without services that the customers are likely to be expecting on a particular day.

SUMMARY

Various embodiments provide a system that includes a server computer comprising a first processor and a first memory storing a first set of instructions that, when executed by the first processor, cause the first processor to perform steps comprising, receiving, from a driver device, one or more vehicle inspection results for a vehicle among a fleet of vehicles. The one or more vehicle inspection results include at least one of: an issue notification identifying an issue with an interior or exterior component of the vehicle, or a driver certification that the vehicle is operable. The steps further compromise, when the issue notification is received, transmitting a report of the issue to a maintenance information device and receiving, in response to transmitting the report of the issue, a maintenance certification that the vehicle is operable from the maintenance information device. The steps further comprise, in response to receiving the driver certification or the maintenance certification, automatically selecting the vehicle for a particular route service, and assigning the vehicle to perform the particular route service based on a request received by the server computer.

In various embodiments, the first set of instructions, when executed by the first processor, cause the first processor to perform steps further comprising identifying an inspection checklist for the vehicle, receiving the inspection checklist from a database, and transmitting the inspection checklist to the driver device In various embodiments, the inspection checklist further provides at least a first interactive element to identify the interior or exterior component is in satisfactory condition, and a second interactive element to report the issue with the interior or exterior component.

In various embodiments, the first set of instructions, when executed by the first processor, cause the first processor to perform steps further comprising storing a digital record of one or more notifications or reports associated with the driver device for a predetermined amount of time.

In various embodiments, an entry on the digital record includes location identification information for the issue identified via the driver device.

In various embodiments, at least a portion of the one or more vehicle inspection results are retrieved from a vehicle device coupled to the vehicle via a communication link between the driver device and the vehicle device.

In various embodiments, the system includes the driver device comprising a second processor and a second memory storing a second set of instructions that, when executed by the second processor, cause the second processor to perform steps comprising establishing a communication link with a vehicle device associated with the vehicle and receiving, from the vehicle device, status information about the vehicle over the communication link.

In various embodiments, the status information about the vehicle further includes a unique identification of the vehicle.

In various embodiments, the first set of instructions, when executed by the first processor, cause the first processor to perform steps further comprising identifying a maintenance action to address the issue with the interior or exterior component of the vehicle, and transmitting an instruction to the maintenance information device to perform the maintenance action.

In various embodiments, the system includes the maintenance information device comprising a third processor and a third memory storing a third set of instructions that, when executed by the third processor, cause the third processor to perform steps comprising receiving, from the server computer, the report of the issue, processing a maintenance of the vehicle to address the issue identified in the report, generating the maintenance certification that the vehicle is operable upon receiving confirmation that the maintenance is successfully completed, and transmitting, to the server computer, the maintenance certification that the vehicle is operable.

Some embodiments provide a method comprising receiving, by a server computer from a driver device, one or more vehicle inspection results for a vehicle among a fleet of vehicles. The one or more vehicle inspection results include at least one of: an issue notification identifying an issue with an interior or exterior component of the vehicle, or a driver certification that the vehicle is operable. The method further comprises, when the issue notification is received, transmitting, by the server computer, a report of the issue to a maintenance information device and receiving, by the server computer in response to transmitting the report of the issue, a maintenance certification that the vehicle is operable from the maintenance information device. The method further comprises, in response to receiving the driver certification or the maintenance certification, automatically selecting, by the server computer, the vehicle for a particular route service, and assigning, by the server computer, the vehicle to perform the particular route service based on a request received by the server computer.

In various embodiments, the method further comprising identifying, by the server computer, an inspection checklist for the vehicle, retrieving, by the server computer, the inspection checklist from a database, and transmitting, by the server computer, the inspection checklist to the driver device.

In various embodiments, the method further comprises storing, by the server computer, a digital record of one or more notifications or reports associated with the driver device for a predetermined amount of time.

In various embodiments, the driver device establishes a communication link with a vehicle device associated with the vehicle, and retrieves status information about the vehicle over the communication link.

In various embodiments, the method further comprises receiving, by the server computer from the driver device, both the issue notification identifying the issue with the interior or exterior component of the vehicle, and the driver certification that the vehicle is operable despite the issue with the interior or exterior component, and analyzing, by the server computer, the issue notification. The method further comprises overriding, by the server computer, the driver certification that the vehicle is operable despite the issue with the interior or exterior component, transmitting, by the server computer, the report of the issue to the maintenance information device; and assigning, by the server computer, the vehicle to perform the particular route service after receiving the maintenance certification that the vehicle is operable from the maintenance information device.

In various embodiments, the method further comprises identifying, by the server computer, a maintenance action to address the issue with the interior or exterior component of the vehicle, and transmitting, by the server computer, an instruction to the maintenance information device to perform the maintenance action.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to vehicles of all types which are assembled into a fleet for a common purpose or goal such as, but not limited to, delivering passengers, delivering goods, or any other purpose. It is an objective of this disclosure to provide a maintenance component in a routing system which identifies and schedules ride service requests. It is a further objective of this disclosure to provide a maintenance component of fleet vehicles within the routing system to ensure vehicles providing ride services are known to the fleet routing system to be certified as safe and maintained.

In the following description of the disclosure, reference is made to the accompanying drawings, which form a part hereof, and in which are shown by way of illustration specific implementations in which the disclosure may be practiced. It is understood that other implementations may be utilized, and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Various embodiments are described herein by using the illustrative use case of implementing a fleet routing system to optimally manage the maintenance, operation, and routing of a fleet of vehicles. Although the fleet routing system may be utilized by schools and/or bus drivers for the transport of children, the embodiments of the present disclosure are not limited to such. In particular the fleet routing system may be implemented by any suitable fleet of vehicles and for the purpose of transporting any suitable cargo, such as passengers, goods, etc. For example, the fleet routing system may be employed by a fleet of delivery vehicles for transporting and delivering packages to customers.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
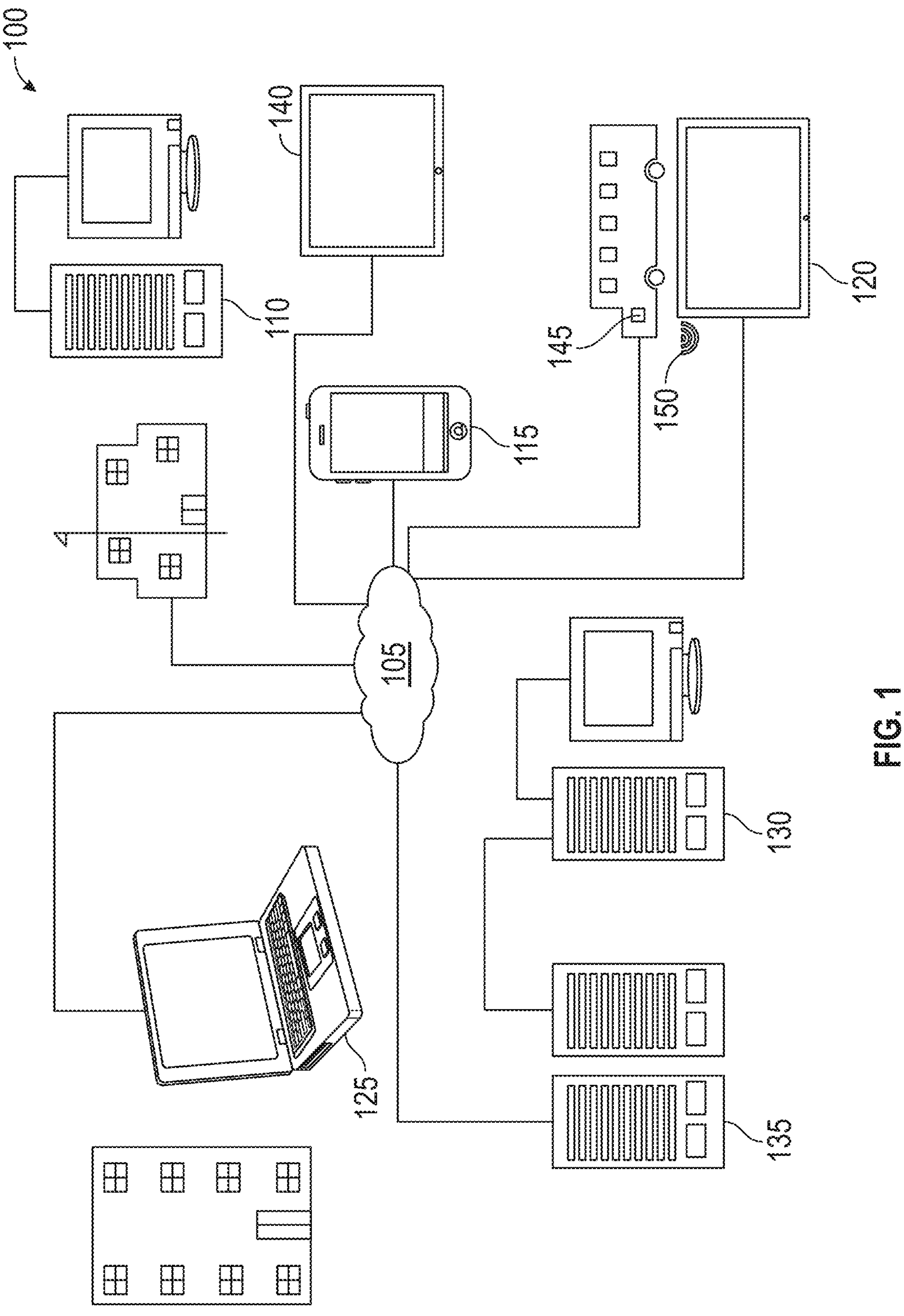
FIG. 1 illustrates box diagram of a fleet routing system, according to various embodiments.

FIG. 1 illustrates a box diagram of a fleet routing system 100, according to various embodiments. As illustrated, the fleet routing system 100 may include a communications network 105, a server computer 135, a wireless connection 150, and various devices (e.g., a mobile phone, tablet device, computer, etc.), such as a ride requester device 110, a user device 115, a driver device 120, an administrator device 125, a provider device 130, a maintenance information device 140, a vehicle device 145, etc. The fleet routing system 100 may be implemented by use of a communications network 105, such as the Internet. The communications network 105 may facilitate the exchange of information between various devices 110, 115, 120, 125, 130, 135, 140, 145 within the fleet routing system 100. The fleet routing system 100 may be used with any fleet of vehicles of similar and/or varying types, such as a fleet of school buses, as described herein. For example, the fleet routing system 100 may be used with a fleet of buses to transport children to and from school. Moreover, the techniques disclosed herein may be used to deliver passengers, goods, etc. with little or no modification.

Turning to the components of the fleet routing system 100 in further detail. In some embodiments, the fleet routing system 100 may be implemented between one or more devices 110, 115, 120, 125, 130, 140, 145 via a communications network 105, such as the Internet, an a server computer 135. The various devices 110, 115, 120, 125, 130, 140, 145 described herein may be implemented by any suitable electronic device with processing power sufficient to share electronic information back and forth via the communications network 105. Example devices 110, 115, 120, 125, 130, 140, 145 include mobile phones, desktop computers, laptop computers, tablets, game consoles, personal computers, mobile devices, notebook computers, smart watches, and any other digital device that has suitable processing ability to interact with the server computer 135. One or more of the devices 110, 115, 120, 125, 130, 140, 145 may comprise one or more processors and memory storing sets of instructions that, when executed by the one or more processors, cause the one or more processors to perform the method described herein. In some embodiment, the various devices 110, 115, 120, 125, 130, 140, 145 may be associated with one or more particular users. For example, the driver device 120 may be associated with a bus driver.

The fleet routing system 100 described herein may be implemented to select, schedule, and/or update routing for one or more vehicles in a fleet of vehicles. For example, a ride requester device 110 may be used to select one or more bus routes for a particular school via a Graphical User Interface (GUI). In an embodiment, the fleet routing system 100 may include a ride requester device 110. The ride requester device 110 may be a school device, an administrator device 125, a user device 115, or any other suitable device capable of at least receiving input and communicating with a driver device 120. Input received by the ride requester device 110 may be associated with the generation and transmission of a requests for providing a ride service by one or more vehicles. For example, a parent of a student may use a user device 115 (e.g., a ride requester device 110) to request a ride service for their child, such as a bus pick up and/or drop off. Moreover, the ride requester device 110 may receive updated information related to a route, request, vehicle, user, etc. For example, the administrator device 125 may receive updated information associated with a requested ride service, such the status of the service, information concerning the maintenance and/or condition of the vehicle performing the service, etc. This updated information may then be presented to a user of the ride requester device 110 on a user interface via the GUI.

In an embodiment, the fleet routing system 100 may include a driver device 120 and a vehicle device 145. The driver device 120 may be configured to communicate with one or more vehicle devices 145. The driver device 120 and the vehicle device 145 may be configured to communicate directly with each other or via a communications network 105. Moreover, both the driver device 120 and the vehicle device 145 may be configured to further communicate with any other device 110, 115, 125, 130, 135, 140 in the fleet routing system 100. For example, the driver device 120 and the vehicle device 145 may be configured to transmit to and receive information from the server computer 135 and the maintenance information device 140. The various devices 110, 115, 125, 130, 135, 140, including the driver device 120 and the vehicle device 145 may be communicatively coupled via a wired or wireless connection 150 using any known wired or wireless communication protocol known in the art. For example, the driver device 120 may be communicatively coupled to the vehicle device 145 via a hardwire linking the two devices 120, 145. In an embodiment, the vehicle device 145 may be implemented as various suitable devices associated with a vehicle. Specifically, the vehicle device 145 may be implemented as an OBD (on board diagnostics) device, a camera with telematics features, and/or a RFID (radio frequency identification) tag. Moreover, the vehicle device 145 and/or the driver device 120 may be associated with a particular vehicles. In some embodiments, the vehicle device 145 and the driver device 120 may be coupled to a particular vehicle, such as via an OBD II port. When coupled to a vehicle, the vehicle device 145 and/or the driver device 120 may be configured to interface with information associated with the vehicle, such as the vehicle's engine, operating systems, location, etc. For example, the vehicle device 145 may be coupled to a bus. The information associated to the coupled bus may be may collected, stored, and/or transmitted. In some embodiments, the information may be transmitted to a server computer 135 and stored in a datastore, such as a database, data table, or any other data storage mechanism suitable for storing data, as historic data.

In an embodiment, one or more devices 110, 115, 120, 125, 130, 140, 145 may be provided with varying levels of authorization. A level of authorization may be associated with a degree of access to the fleet routing system 100 and allowable actions to be taken within the fleet routing system 100. In some embodiments, the access may be dictated by a particular device 110, 115, 120, 125, 130, 140, 145, such as the provider device 130, or the server computer 135. For example, a school district may use one or more administrator devices 125, which may be authorized to select, schedule, and/or update information associated with buses picking up and delivering children to a school. Alternatively, a user device 115 may only be authorized to select, schedule, and/or update information associated with one bus picking up and delivering one child associated with the user device 115. By providing the devices 110, 115, 120, 125, 130, 140, 145 with varying levels of authorization, different types of users with various levels of administration authorization may access and implement the fleet routing system 100 according to their particular needs. For example, the fleet routing system 100 may be implemented by an administrator device 125 and a provider may supply the administrator device 125 or the ride requester device 110 with access to the fleet routing system 100 by use of the server computer 135 and/or provider device 130. In one implementation, a school district may use an administrator device 125 which provides buses to pick up and deliver children to a school and operates in a manner similar to a ride requester device 110. Alternatively or additionally, the ride requester device 110 may be utilized to schedule routing for bus routes for a particular school.

In an embodiment, the fleet routing system 100 may further include a maintenance information device 140. The maintenance information device 140 may be associated with a maintenance facility which has been contracted or otherwise engaged to perform maintenance on one or more vehicles in a fleet vehicles. The maintenance information device 140 may be connected to the fleet routing system 100 via the communications network 105 and receive and share information from other devices, 120, 125, 130, 140, 145 within the fleet routing system 100. For example, the maintenance information device 140 may transmit information to the driver device 120, the server computer 135, the provider device 130, an administrator device 125, and/or ride requester device 110. In some embodiments, the maintenance information device 140 may be implemented using any personal electronic device suitable for implementing the fleet routing system 100 as set forth herein. As described in more detail with respect to FIG. 5, the maintenance information device 140 may be implemented to address the maintenance of a vehicle. Specifically, the maintenance information device 140 may be configured to receive, from a server computer 135, a report of an issue with an interior or exterior component of a vehicle. Then the maintenance information device 140 may process maintenance of the vehicle to address the issue identified in the report. For example, the maintenance information device 140 may receive an issue report indicating an issue with a battery in a vehicle. The maintenance information device 140 may then proceed to process maintenance to address the battery issue, such as scheduling repair work, ordering parts, assigning personnel to work on the bus, etc. Once maintenance is processed, the maintenance information device 140 may generate a maintenance certification that the vehicle is operable upon receiving confirmation that the maintenance has been successfully completed. The maintenance certification that the vehicle is operable may, then be transmitted to a server computer 135.

As described herein, the components of the fleet routing system 100 may be utilized to optimally manage the maintenance, operation, and routing of a fleet of vehicles. In an embodiment, a provider device 130 may enable one or more devices 110, 115, 120, 125, 130, 140, 145, such as a ride requester device 110 and/or an administrator device 125, to access to the fleet routing system 100 by the server computer 135 to create vehicle routing. For example, a ride requester device 110 may access the fleet routing system 100 to create bus routing for a particular school district or school as appropriate. In some embodiments, the server computer 135 may provide a user interface to the one or more devices 110, 115, 120, 125, 130, 140, 145 (e.g., ride requester device 110 and/or the administrator device 125) to create routes for individuals associated with the fleet routing system 100. The user interface may be utilized to create and/or access profiles for individuals associated with the fleet routing system 100. The profiles may then be stored in non-volatile non-transitory computer-readable medium/storage media. The profiles may include information associated with particular individual, such as a user identification number, routes associated with the user, etc. For example, each child in a district may have an associated profile including a home address for the child. The ride requester device 110 may then be utilized to create routes for each child based on the home addresses on the child's profile. In an embodiment, in response generating routes, the fleet routing system 100 may determine distance between identified stops and travel times between each of those identified stops to determine both a single vehicle route and a number of vehicles required for a necessary number of routes. For example, based on a standard bus configuration, a school bus may transport 80 seated students. However, due to time and distance constraints, a certain bus may only be able to pick up 45 students at the identified stops. The identified stops may be based on ensuring a child does not cross a road or lives within a certain distance of the identified stop. If one location is heavily populated with children who need to board a school bus, optimized routing may determine that since more children are boarding per identified stop, that particular school bus may need less time to complete an assigned route. In an embodiment, the fleet routing system 100 may optimize routes based on various basis meaningful to the entities or communities associated with the fleet of vehicles, such as optimizing routes based on the shortest time on the road for each vehicle or based on specific optimizing factors such as minimal fuel usage across the fleet, minimal emissions across the fleet, etc. For example, a school or community served by the school may be particularly concerned with cost savings and opt to optimize routes based on minimizing fuel usage across a fleet of buses.

In an embodiment, vehicle information may be transmitted to one or more devices 110, 115, 120, 125, 130, 140, 145 based on the user(s) associated with the devices 110, 115, 120, 125, 130, 140, 145. For example, once the routes are generated with children assigned to a particular bus, the server computer 135 may transmit bus information to the user device 115 associated with the children and/or the parents or guardians of the children. In this case, the bus information may include bus stop information for picking up a child and a time for pick up at the bus stop. As discussed, the one or more devices 110, 115, 120, 125, 130, 140, 145 may be associated with a particular individual. For example, the user device 115 may be associated with a child bus rider or with a parent of the child bus rider. Additionally or alternatively, the one or more devices 110, 115, 120, 125, 130, 140, 145 may be implemented as separate devices where a first device is associated with the a first user (e.g., a child rider) and a second device is associated with a second user (e.g., a parent, guardian, or other supervisor of a child). Information may be shared and/or transmitted between the first device and the second device based on the relationship between the first user and the second user. For example, when the school bus is operating, a real time location of the school bus may be provided to a user device 115 of a child on the bus and a user device 115 of a parent or guardian of the child so that the child and child's parent or guardian may identify where the bus is currently located. In another example, a child may use a first user device 115 to create a profile or a parent or guardian of a child may use a second user device 115 to create a profile for the child by transmitting information from the first or second user device 115 via the communications network 105 to the server computer 135.

Once the routes are generated, the server computer 135 may transmit individual route information to a driver via the driver device 120 and/or the vehicle device 145 in the fleet routing system 100. For example, a bus driver may receive individual route information which may be a mandatory bus route for the driver to follow with a stop sequence that is identified along the individual route. The individual route information may include turn by turn instructions with expected drive time duration and distance for the vehicle associated with the driver device 120. In an embodiment, the driver device 120 may also detect information from a particular route driven and provide that information to the server computer 135 through communications network 105. Information provided from the driver device 120 may include distance traveled information, fuel use information, pickup duration information, stop location information (e.g., information about where the stop is designated versus where the stop actually occurred), speed of travel information (in terms of actual speeding and in terms of slowdowns caused by traffic, construction, or any other road condition), rider verification information, rider disembarking information, and any other information that may be used by the server computer 135 to optimize routing. The collected information may be stored in a datastore, such as a database, data table, or any other data storage mechanism suitable for storing data, as historic data accessible by the server computer 135. The historic data may be stored for a predetermined amount of time. For example, the historic data may be stored for a period of 5 years or for as long as the vehicle associated with data is part of the fleet. In an embodiment, the driver device 120 may receive an optimized route from the server computer 135 based at least in part on the information, such as the aforementioned historic data, provided by the driver device 120 and/or other devices 110, 115, 120, 125, 130, 140, 145 of the fleet routing system 100. For example, the driver device 120 may receive an optimized route from the server computer 135 for picking up children based on information received from one or more devices 110, 115, 120, 125, 130, 140, 145 indicating a home or a school address and/or prior pickup/drop off history locations for children on a particular route.

In an embodiment, the server computer 135 may receive information from one or more devices 110, 115, 120, 125, 130, 140, 145 (e.g., the driver device 120) which may be used to optimize routes based on the received information. For example, a route may be optimized based on learning from past driver routes to determine a best path between stops. In another example, the server computer 135 may receive information from a driver device 120 which may be used to optimize routes based on learned roadblocks and driver input to the driver device 120 with new information (e.g., a street closure or construction) which causes the server computer 135 to reoptimize the route. In another example, the server computer 135 may use received information to determine and store driving instructions at the ride route level for a particular vehicle and driver device 120. The fleet routing system 100 may be optimized to enforce particular driving patters, such as optimizing a route to prevent U-turns. For example, a bus may receive a route via the fleet routing system 100 which is optimized to discourage U-turns and enforce curbside pickup to avoid children crossing streets In an embodiment, the server computer 135 may track a vehicle via the one or more devices 110, 115, 120, 125, 130, 140, 145 during travel and ensure compliance with the optimized route. If the one or more devices 110, 115, 120, 125, 130, 140, 145 indicates that a vehicle is not following the optimized route information, the server computer 135 may send a message to the one or more devices 110, 115, 120, 125, 130, 140, 145 (e.g., the ride requester device 110, the administrator device 125, or the provider device 130) to allow either the either the users of said devices 110, 115, 120, 125, 130, 140, 145 or the server computer 135 to contact the driver of the vehicle with route correction instructions to enhance adherence to the route.

In an embodiment, when a vehicle is operating, a real time location may be provided to the one or more devices 110, 115, 120, 125, 130, 140, 145. For example, real time location for a bus may be provided to a user device 115 so that the child assigned to said bus may identify where the bus is currently located as well as the arrival time of the bus. Based on information received from the one or more devices 110, 115, 120, 125, 130, 140, 145, the server computer 135 may maintain estimated global positioning system ("GPS") waypoints and an estimated time of arrival ("ETA") information for each ride, which may be constantly updated based on information provided by the one or more devices 110, 115, 120, 125, 130, 140, 145. The one or more devices 110, 115, 120, 125, 130, 140, 145 may further provide real-time routing, navigation, and path information based on a current location of the one or more devices 110, 115, 120, 125, 130, 140, 145. For example, a user device 115 may provide routing information based on the route associated with the current location of the user device 115. In an embodiment, the routing, navigation, and path information may be displayed on a user interface via a GUI associated with the one or more devices 110, 115, 120, 125, 130, 140, 145. For example, a user may receive, via a user device 115, expected vehicle path information on a map displayed on a screen of the user device 115. Thus, the user of the user device 115 may be able to track a bus associated with a driver device 120 in real-time and observe where the bus is currently and when the bus will be at a specific stop, which may be identified by waypoints provided to the user from the server computer 135 via the user device 115. In an embodiment, any data received from the one or more devices 110, 115, 120, 125, 130, 140, 145 may be stored as historical data for an indeterminate or predetermined period of time in a datastore, such as a database, data table, or any other data storage mechanism suitable for storing data, accessible by the server computer 135. In turn, the historical data may be used to further optimize vehicle routing on a permanent or temporary basis depending on road conditions, pickup/drop off requirements, and any other factor identified herein.

In various embodiments, the one or more devices 110, 115, 120, 125, 130, 140, 145 of the fleet routing system 100 may be implemented as any electronic device with processing power sufficient to share electronic information back and forth through the communications network 105. Examples of the one or more devices 110, 115, 120, 125, 130, 140, 145 include mobile phones, desktop computers, laptop computers, tablets, game consoles, personal computers, mobile devices, notebook computers, smart watches, and any other digital device that has the processing ability to interact with the server computer 135. The one or more devices 110, 115, 120, 125, 130, 140, 145 may include software and hardware modules that execute computer operations and communicate with the communications networks 105 and the server computer 135. Further, hardware components of the one or more devices 110, 115, 120, 125, 130, 140, 145 may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within the one or more devices 110, 115, 120, 125, 130, 140, 145 may be used to connect with the server computer 135. For example, the one or more devices 110, 115, 120, 125, 130, 140, 145 may comprise a processor and a memory storing a set of instructions that, when executed by the processor, cause the processor to perform the operations described herein.

In some embodiments, a server computer 135 may be used to perform various operations of the fleet routing system 100. For example, the server computer 135 may receive vehicle inspection results for a vehicle among a fleet of vehicles and, in response to receiving the vehicle inspection results, the server computer 135 may automatically select and assign a vehicle for a particular route service. The server computer 135 may be implemented as one or more devices, but is collectively referred to herein as a server computer 135. The server computer 135 may include one or more processors and one or more memory (e.g., one or more non-transitory computer-readable medium) storing instructions that, upon execution by the one or more processors, may cause the one or more processors to perform the operations described herein. In some embodiments, the server computer 135 may provide web-based access to the fleet routing system 100 (or relevant portions of the fleet routing system 100) based on which device 110, 115, 120, 125, 130, 140, 145 is associated with a particular function—e.g., a parent using a user device 115 may not have permissions to reroute buses. The server computer 135 may communicate in the fleet routing system 100 via the communications network 105, which may be a wired, wireless, or both. The server computer 135 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to execute optimized routing, maintenance, and communication for a web-based fleet routing system 100. The server computer 135 may include software and hardware modules, sequences of instructions, routines, data structures, display interfaces, and other types of structures that execute server computer operations. Further, hardware components of the server computer 135 may include a combination of Central Processing Units ("CPUs"), buses, volatile and non-volatile memory devices, storage units, non-transitory computer-readable storage media, data processors, processing devices, processors, control devices transmitters, receivers, antennas, transceivers, input devices, output devices, network interface devices, and other types of components that are apparent to those skilled in the art. These hardware components within the server computer 135 may be used to execute the various processes, methods and/or algorithms disclosed herein, and interface with the one or more of devices 110, 115, 120, 125, 130, 140, 145.

In an embodiment, the server computer 135 may interface with one or more devices 110, 115, 120, 125, 130, 140, 145 via the communications network 105. In each case, the wireless communications network 105 may connect the one or more devices 110, 115, 120, 125, 130, 140, 145 via an internet connection provided by the communications network 105. The communications network 105 may be communicatively coupled to the server computer 135, as well as the one or more devices 110, 115, 120, 125, 130, 140, 145 to facilitates the access, storing, and/or exchange of information. Any suitable internet connection may be implemented for the wireless communications network 105 including any wired, wireless, or cellular based connections. The communications network 105 may be a wired, wireless, or both and may include one or more of any suitable communications path, such as a mobile network, a cable or fiber optics network, a WAN or LAN network, the Internet, or any other suitable means to facilitate communications in the fleet routing system 100. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network and its successors, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between, the devices 110, 115, 120, 125, 130, 140, 145 and the server computer 135.

Figure 2A:
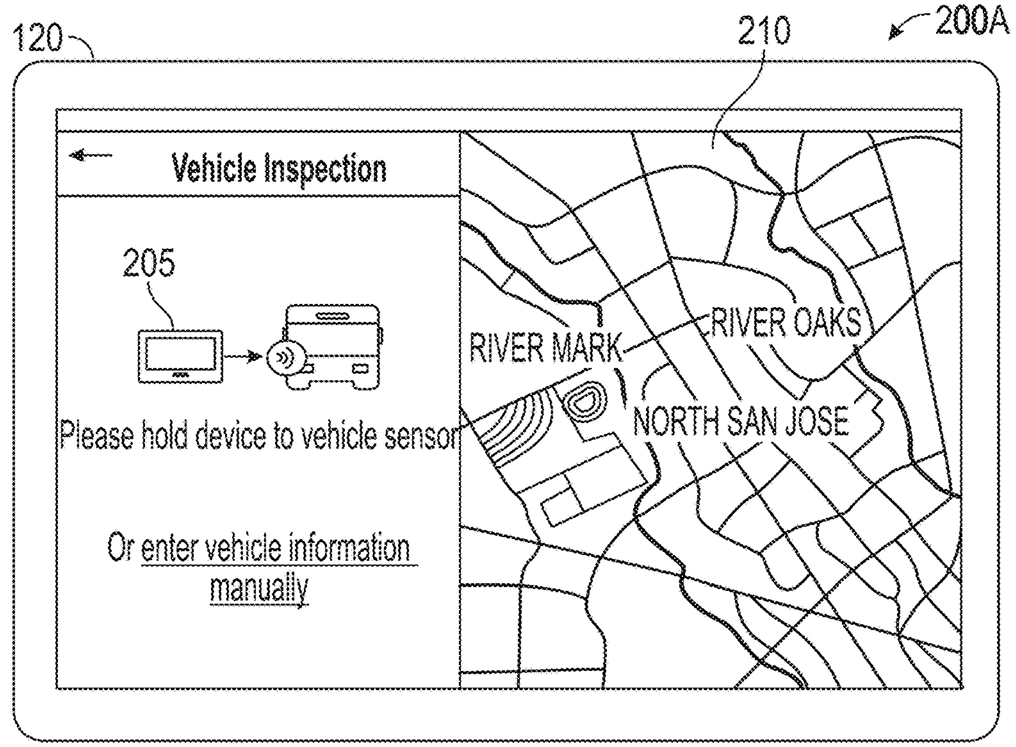
FIG. 2A illustrates a user interface for conducting a vehicle inspection, according to various embodiments.

FIG. 2A illustrates a user interface 200A for conducting a vehicle inspection, according to various embodiments. In an embodiment, a user interface 200A may be provided via one or more devices 110, 115, 120, 125, 130, 140, 145, such as the driver device 120, via a GUI. The user interface 200A may be configured to allow the user (e.g., driver) to communicate with the server computer 135, the maintenance information device 140, and or the vehicle device 145 via the communications network 105 and the driver device 120. As shown in FIG. 2, the user interface 200A may include one or more interactive elements 205. In an embodiment, an interactive element 205 may be configured to guide a user via a driver device 120 to connect the driver device 120 to the vehicle device 145. Alternatively or additionally, the driver device 120 and/or the vehicle device 145 may be configured to automatically connect. For example, the driver device 120 may automatically connect to the vehicle device 145 upon initiation of the user interface 200A. Either automatically or through interaction with the interactive element 205, a communication link may be established between the driver device 120 and the vehicle device 145 associated with a vehicle. The communication link may be a wired or wireless connection using any known wired or wireless communication protocol known in the art. In turn, when the driver device 120 is connected to the vehicle device 145, the driver device 120 may receive status information about the vehicle from the vehicle device 145 over the communication link. For example, an OBD device may collect status information about the speed of the vehicle, the location of the vehicle, warnings or notifications generated by an engine computer, and other status information which may be shared with the driver device 120 and/or the server computer 135 from vehicle device 145. In an embodiment, the status information about the vehicle may further include a unique identification of the vehicle. For example, the status information may include unique identification indicating a particular bus associated with the collected status information. In an embodiment, the user interface 200A may further include one or more information elements 210, which may be used to provide information to a user/driver. The information element 210 may be configured to provide routing information or one or more maps via the GUI. For example, as illustrated in FIG. 2A, the information element 210 can provide a map with the current location of a particular vehicle.

Figure 2B:
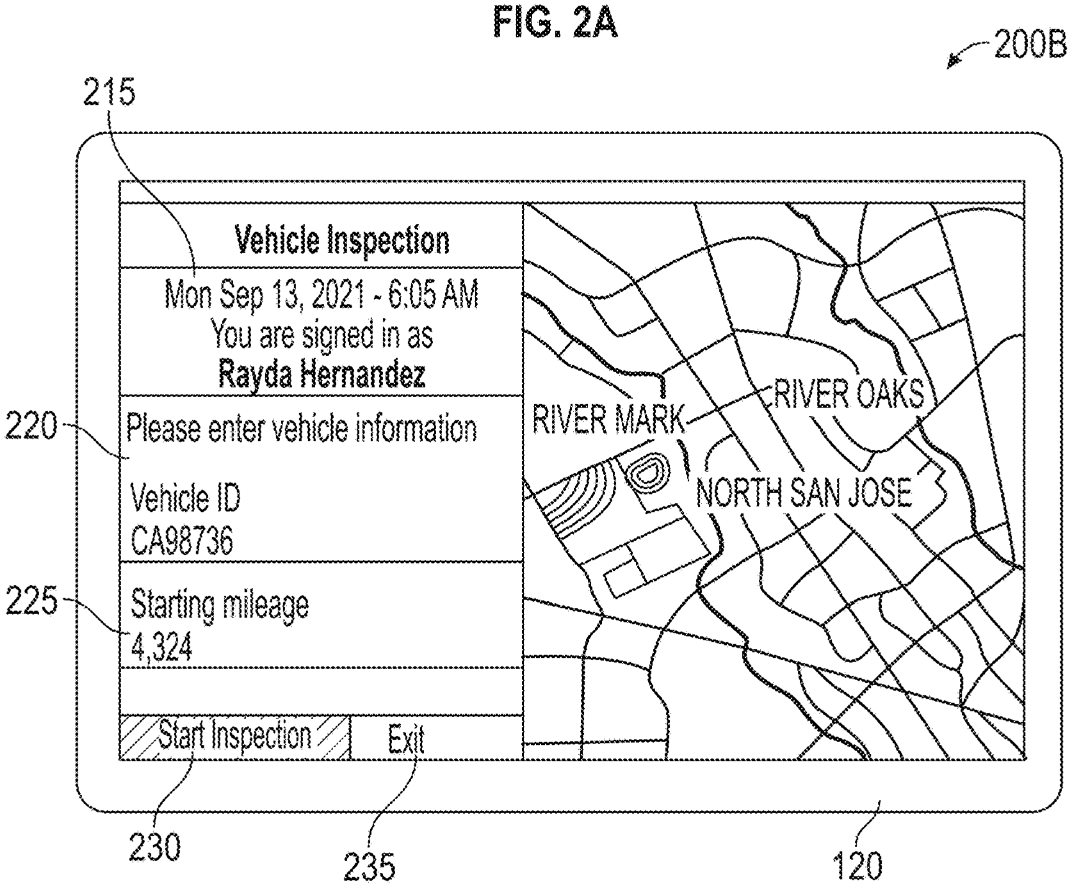
FIG. 2B illustrates another user interface for conducting a vehicle inspection, according to various embodiments.

FIG. 2B illustrates another user interface 200B for conducting a vehicle inspection, according to various embodiments. In an embodiment, the user interface 200B may be provided by a driver device 120 via a GUI. Once the vehicle device 145 is connected to driver device 120 and/or server computer 135, the driver device 120 may receive information about the vehicle via the user interface 200B. For example, the driver device 120 may display information about the vehicle such as a vehicle identification number. Information about the vehicle may be conveyed via the user interface 200B using one or more interactive elements 220, 230, 235. In an embodiment, the interactive element(s) 220, 230, 235 may be configured to receive user input. For example, the interactive element 220 may accept user input associated with information from the user about the identification of the vehicle. Alternatively or additionally, the interactive element(s) 220, 230, 235 may be automatically populated by information received from the vehicle device 145 and/or the server computer 135. For example, the interactive element 220 may be populated with a vehicle identification number received from the vehicle device 145 and/or the server computer 135. The interactive element(s) 220, 230, 235 may convey information regarding one or more vehicles associated with the vehicle device 145 and/or the server computer 135. For example, the interactive element(s) 220, 230, 235 may identify a specific vehicle with a unique identifier assigned to the vehicle by the server computer 135 (e.g., "CA98736"). In an embodiment, a user may further utilize the interactive element(s) 220, 230, 235 to initiate, interact with, and/or cease various processes in the fleet routing system 100. For example, the interactive element(s) 220, 230, 235 may be used to stop routing of a vehicle. In one embodiment, the interactive elements 230 and 235 may allow a user to begin a vehicle inspection or may allow a user to exit from the vehicle inspection process.

In an embodiment, the user interface 200B may include on or more information elements 215, 225. The one or more information elements 215, 225 may provide information about a vehicle. For example, the user interface 200B may include an information element 215, which may specify one or more of a date and an identification of the driver, and an information element 225, which may provide other information about the vehicle, such as the starting mileage of the vehicle. For example, as illustrated in FIG. 2B, is the information element 225 provides information indicating 4,324 miles logged on the engine associated with the vehicle. In an embodiment, the one or more information elements 215, 225 may provide information associated with one or more vehicle inspection result(s). At least a portion of the one or more vehicle inspection result(s) may be retrieved from a vehicle device 145 and/or the server computer 135 coupled to a vehicle via a communication link between the driver device 120 and the vehicle device 145 and/or the server computer 135. For example, a vehicle computer may detect low tire pressure on at least one tire of a vehicle and the vehicle device 145 may then relay the information regarding the low tire pressure as a vehicle inspection result to the driver device 120 and/or the server computer 135.

Figure 3:
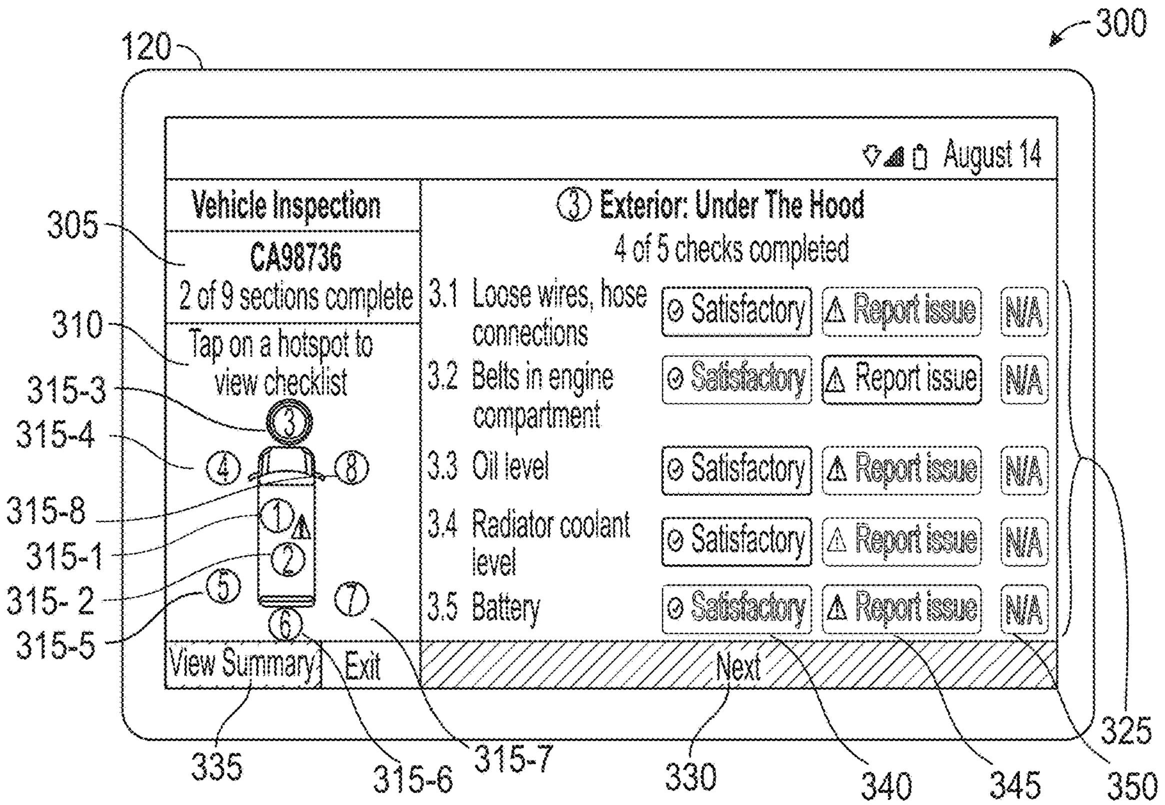
FIG. 3 illustrates another user interface for identifying issues in a vehicle inspection, according to various embodiments.

FIG. 3 illustrates another user interface 300 for identifying issues in a vehicle inspection, according to various embodiments. In response to selecting interactive element 230, the user interface 300 may be provided on the driver device 120. The user interface 300 may provide an information interface 305 and/or instructions 310 for interfacing with the user interface 300. For example, as illustrated in FIG. 3, an information interface 305 is presented indicating that 2 of 9 sections of a vehicle inspection are complete. In an embodiment, the user interface 300 may include an inspection checklist 325. The inspection checklist 325 may be specific to a vehicle type or a location/district. For example, the inspection checklist 325 for a bus may differ from the inspection checklist 325 for a delivery truck. One or more inspection checklists 325 may be stored in a datastore, such as a database, data table, or any other data storage mechanism suitable for storing data, accessible by the server computer 135. In an embodiment, the sever computer 135 may be configured to identify and retrieve a particular inspection checklist 325 stored in the datastore (e.g., database). For example, a server computer 135 may identify the appropriate inspection checklist 325 based on a vehicle identification. Once retrieved, the sever computer 135 may then transmit the inspection checklist 325 to a driver device 120.

In an embodiment, the user interface 300 may further include a representative diagram of a vehicle, such as a bus, with location identifiers 315 positioned around the representative diagram of the vehicle. The location identifiers 315 may be associated with questions in an inspection checklist 325 presented via the user interface 300. Furthermore, other identifiers may be illustrated with respect to the representative diagram of the vehicle which convey various information associated with a vehicle. Identifiers may be used to convey potential vehicle operation or safety issues for review by a user using driver device 120. For example, as shown in FIG. 3, a "hotspot" in the instructions 310 is identified as being associated with the location identifier 3. The inspection checklist 325 is identified with the location identifier 3, which is associated with questions provided in the inspection checklist 325, which include examples of loose wires and hose connections, belts in engine compartment, oil level, radiator coolant level, battery condition, and other questions related to a condition of an engine in the vehicle.

In an embodiment, a user may interact with the inspection checklist 325 at the driver device 120 via one or more interactive elements 330, 340, 345 to convey one or more vehicle inspection results for a vehicle. In turn, the vehicle inspection results may be transmitted to the server computer 135. For example, interaction with the one or more interactive elements 330, 340, 345 may indicate an issue notification identifying an issue or may indicate a driver certification that the vehicle is operable. In an embodiment, interactions with the one or more interactive elements 330, 340, 345 of the inspection checklist 325 may generate a vehicle inspection result including an issue notification identifying an issue and/or the condition of an interior and/or exterior component of the vehicle. For example, as illustrated in FIG. 3, a user may interact with interactive element 340 to generate a vehicle inspection result including an issue notification identifying that an interior or exterior component of a vehicle is in satisfactory condition. In another example, a user may interact with interactive element 345 to generate a vehicle inspection result identifying an issue with any of the engine parts or conditions identified in the inspection checklist 325. In an embodiment, the vehicle inspection results including the issue notification may then be transmitted to the server computer 135 from the driver device 120. When the vehicle inspection results including an issue notification are received at the server computer 135, a report of the issue associated with the issue notification may be transmitted to a maintenance information device 140, as described in further detail with respect to FIG. 5.

In another embodiment, interactions with the one or more interactive elements 330, 340, 345 of the inspection checklist 325 may generate a vehicle inspection result including a driver certification. A driver certification may indicate that the interior and/or exterior component to the vehicle inspected is satisfactory and/or that the vehicle is operable. In one embodiment, a driver certificate may be generated on if every item on an inspection checklist 325 has been marked as satisfactory by a user. For example, if only two of three items on an inspection checklist 325 are marked as satisfactory, a driver certification may not be generated. Instead an issue notification identifying the issue associated with the third unsatisfactory item on the inspection checklist 325 may be generated.

In another embodiment, interactions with the one or more interactive elements 330, 340, 345 of the inspection checklist 325 may generate a vehicle inspection result indicating that the inspection of an interior and/or exterior component of the vehicle is not applicable. For example, a user may interact with interactive element 350 to indicate that the inspection for that particular engine part or condition is not applicable.

While FIG. 3 illustrates only an inspection checklist 325 associated with "under the hood," the driver device 120 may provide an inspection checklist 325 associated with different areas of the vehicle, including the interior and the exterior of the vehicle. For example, the location identifier 315-1 may be associated with an interior of the vehicle and include questions about seats, seatbelts as applicable, a condition of the walls of the vehicle, or anything else having to do with the interior of the vehicle. The location identifier 315-2 may be associated with an interior roof of the vehicle and include questions about the condition of the interior side of the roof of the vehicle. The location identifiers 315-4 and 315-8 may include questions about the exterior of the vehicle and include questions about mirrors, fold out stop signs, lights, doors, windows, or any other element of a vehicle. The location identifiers 315-5 and 315-7 may include questions about the exterior of the vehicle and include questions about the body o—the vehicle, the wheels, tires, undercarriage, or any other element of the vehicle. The location identifier 315-6 may include questions about the exterior of the vehicle and include questions about a rear door, trunk, lights, exhaust, or any other element of the vehicle.

The location identifiers 315 may vary but are merely representative of various areas of the vehicle for which questions could be asked in the inspection checklist 325. In other words, it is contemplated that any question with respect to the condition of the vehicle could be associated with the inspection checklist 325 and not limited to the examples shown in FIG. 3. Broadly speaking, the driver device 120 may provide the inspection checklist 325 which covers questions about an inspection of any interior or exterior component or condition of the vehicle and the user may interact with the driver device 120 via interactive element 330 to move through the inspection checklist 325 to answer each question provided in the inspection checklist 325. Additional information about the condition of the vehicle may be provided to the driver device 120 via the vehicle device 145. For example, the vehicle device 145 may obtain readings such as an oil level for a gas engine or a battery charge level for an electric vehicle, tire pressure level, and the like. In some embodiments, the inspection checklist 325 may include questions about the interior or exterior components or conditions of a vehicle which may be determined by the server computer 135 and transmitted to the driver device 120 for display in the inspection checklist 325. A user may interact with an interactive element 335 (e.g., a view summary button) to see a summary of items identified as a reported issues in the inspection checklist 325, as will be shown in FIG. 4.

Figure 4:
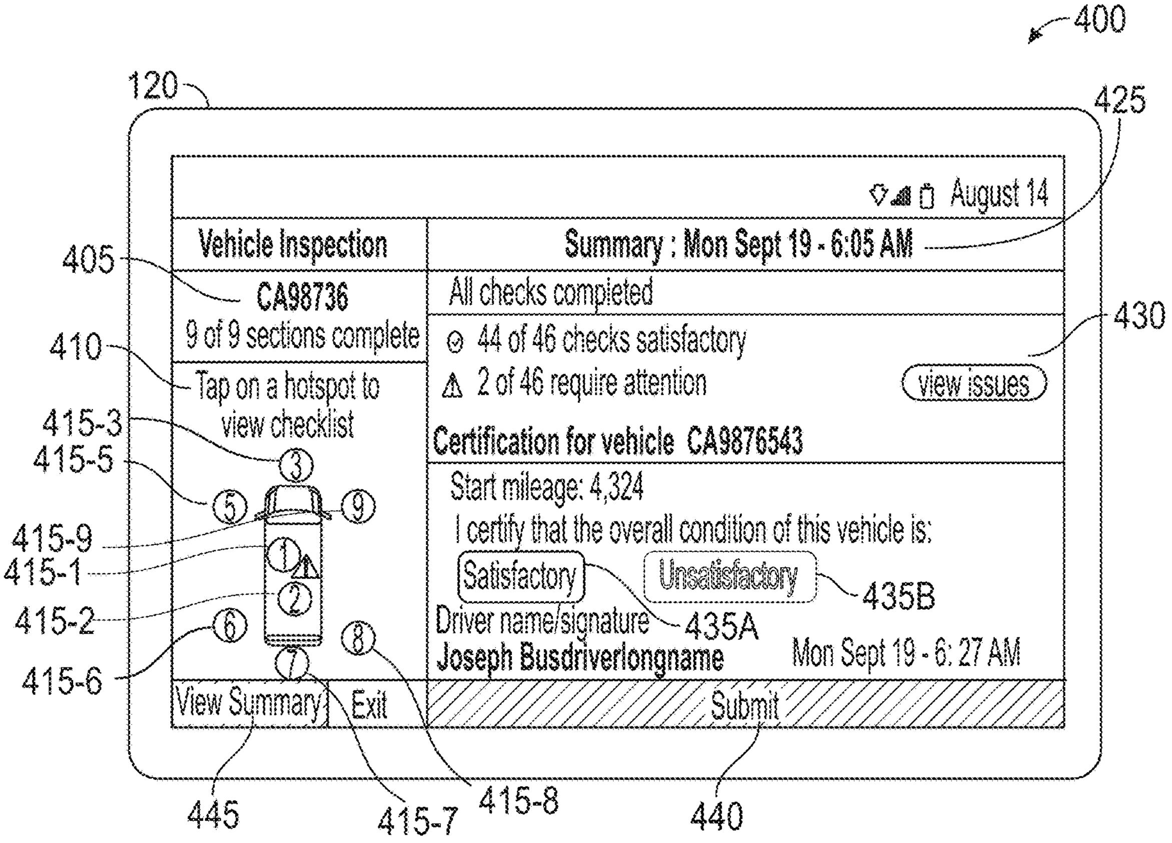
FIG. 4 illustrates another user interface for reporting maintenance issues, according to various embodiments.

FIG. 4 illustrates another user interface 400 for reporting maintenance issues, according to various embodiments. The user interface 400 may be provided on a driver device 120 which includes an information interface 405 and instructions 410 for interfacing with user interface 400. The user interface 400 may further include a representative diagram of a vehicle, such as a bus, with location identifiers 415 positioned around the representative diagram of the vehicle. Other identifiers may be illustrated with respect to the representative diagram of the vehicle which identify potential vehicle operation or safety issues for review by a user using the driver device 120. In an embodiment, the driver device 120 may identify location identifiers 415 including the interior and the exterior of the vehicle. For example, the location identifier 415-1 may be associated with an interior of the vehicle including seats, seatbelts as applicable, a condition of the walls of the vehicle, or anything else having to do with the interior of the vehicle. The location identifier 415-2 may be associated with an interior roof of the vehicle and the interior side of the roof of the vehicle. The location identifiers 415-4 and 415-8 may identify mirrors, fold out stop signs, lights, doors, windows, or any other element of a vehicle. The location identifiers 415-5 and 415-7 may identify a part of the vehicle, the wheels, tires, undercarriage, or any other element of the vehicle. The location identifier 415-6 may identify a part of the vehicle, such as a rear door, trunk, lights, exhaust, or any other element of the vehicle.

In an embodiment, the user interface 400 may further include a summary 425 of the responses made in the inspection checklist 325, shown in FIG. 3. The summary 425 may be either displayed in the user interface 400 or accessed through one or more interactive elements 430, 435A, 435B, 440, 445 (e.g., interactive element 445), such as a view summary button as illustrated in FIG. 4. The summary 425 may include various information associated with the inspection checklist 325. For example, the summary 425 may include date and time information, the number of questions or checks completed, and/or an identification of which of the questions in the inspection checklist 325 were identified as needing attention. The summary 425 may include a user interface element (interactive element 430) which may allow a user to request a display of the identified issues associated with a vehicle inspection.

In an embodiment, a user may interact with the summary 425 via one or more interactive elements 430, 435A, 435B, 440, 445 to convey one or more vehicle inspection results for a vehicle. In turn, the vehicle inspection results may be transmitted to the server computer 135. For example, interaction with the interactive elements 435A, 435B may allow a user to assert a condition of a vehicle and generate an associated driver certification. In an embodiment, interaction with the one or more interactive elements 435A, 435B, 440, 445 may generate a vehicle inspection result including a driver certification of the vehicles condition. For example, a user may interact with the user interface 400 to assert a condition of a vehicle via a satisfactory indicator (interactive element 435A) and an unsatisfactory indicator (interactive element 435B). The satisfactory indicator (interactive element 435A) and the unsatisfactory indicator (interactive element 435B) may enable a user to assert that a vehicle is in serviceable and safely operable condition based on the inspection performed via the inspection checklist 325. In another embodiment, the user interface 400 may further allow a user to provide an electronic signature. The electronic signature may be further included in the driver certification of the vehicle to certify the condition of a vehicle. For example, a user input may indicate an electronic signature certifying the condition of a vehicle as satisfactory. In an embodiment, the user interface 400 may further allow a user to interact with interactive element 440 (e.g., a submit button) to allow a user to submit the vehicle inspection results including the driver certification that an identified vehicle has been inspected and is in serviceable safe operating condition. In response to a user interaction with interactive element 440, the vehicle inspection results including the driver certification may be transmitted to the server computer 135.

In an embodiment, responsive to receiving a driver certification at the server computer 135 from a driver device 120, a vehicle may be routed. In particular, the server computer 135 may automatically select a vehicle associated with the driver certification received from the driver device 120 for a particular route server. For example, a bus with a driver certification that the bus is operable may be automatically selected for a particular bus route service. Once selected, the vehicle may be assigned to perform the particular route service based on a request received by the server computer 135. For example, a school device, such as a ride requester device 110, may send a request to the server computer 135 for a bus to service a route to pick up children attending the school. The server computer 135 may assign a bus with a driver certification indicating that the bus is operable to service the route to pick up children based on the request.

In an embodiment, the server computer 135 may store a digital record at one or more datastores, such as a database, data table, or any other data storage mechanism suitable for storing data, accessible by the server computer 135. The digital record may include information associated with one or more driver devices 120 and/or one or more vehicles in a fleet stored as entries in the digital record. In an embodiment, the information included in the digital record may be current data received from one or more devices 110, 115, 120, 125, 130, 140, 145. For example, the digital record may include data received from a driver device 120 identifying a current issue with a vehicle associated with the driver device 120. Alternatively or additionally, the information included in the digital record may be historic data received from one or more device 110, 115, 120, 125, 130, 140, 145. For example, the digital record may be historic data such as reports from the past 3 years. In an embodiment, the historic data may be maintained for a predetermined amount of time. For example, the historic data may be maintained in the digital record for 5 years or for as long as the vehicle associated with the historic data is part of the fleet. Alternatively or additionally, the historic data may be maintained in the digital record until manually removed. For example, the historic data may be maintained until a user removes the historic data at the server computer 135. In an embodiment, the information included in the digital record may include one or more notifications (e.g., an issue notification identifying an issue with an interior or exterior component of the vehicle) or reports associated with one or more driver devices 120. For example, a digital record may include an entry for an issue notification identifying an issue with a battery on a bus. In an embodiment, an entry on the digital record may further include location identification information for an issue identified via a driver device 120. For example, an entry of the digital record may include location identification information for an issue of damage, where the location identification information identifies the location of the damage (e.g., the issue) as an exterior door on a vehicle.

In an embodiment, when the server computer 135 receives a vehicle inspection result including an issue notification, the server computer 135 may proceed to identify a maintenance action. The maintenance action may be one or more actions selected to address the one or more issues associated with the issue notification (e.g., one or more issues with the interior and/or exterior component of a vehicle). For example, the server computer 135 may identify the action of replacing the battery in a bus to address the issue notification identifying a malfunctioning battery in said bus. The server computer 135 may then transmit an instruction to the maintenance information device 140 to perform the identified maintenance action. For example, for the maintenance action replacing the battery in a bus, the server computer 135 may transmit instructions to perform the replacement of a battery in a bus to a maintenance information device 140 associated with the bus.

Figure 5:
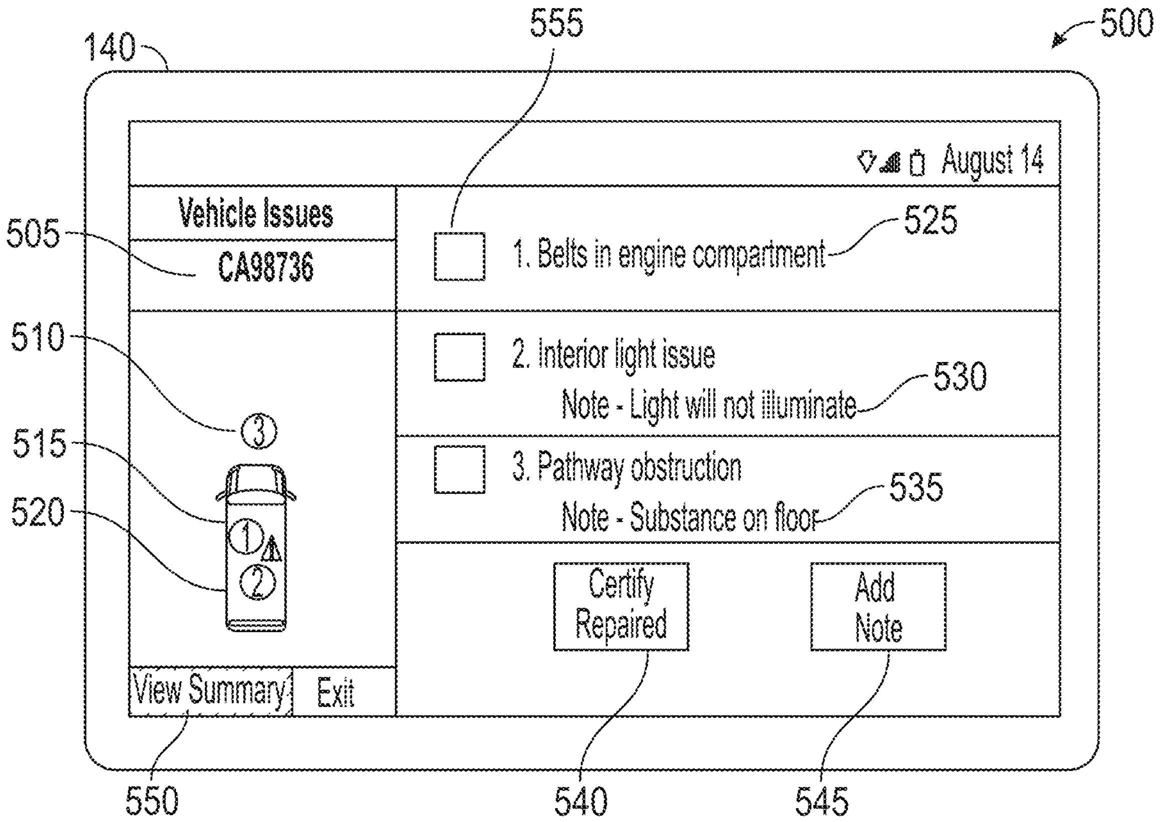
FIG. 5 illustrates a user interface for certifying performed maintenance and repairs, according to various embodiments.

FIG. 5 illustrates a user interface 500 for certifying maintenance and repairs, according to various embodiments. The user interface 500 may be associated with a maintenance information device 140. In an embodiment, the maintenance information device 140 may be associated with one or more users tasked or responsible to perform repairs on a vehicle. For example, the maintenance information device 140 may be associated with a mechanic performing repairs on a bus. In an embodiment, the maintenance information device 140 may configured to convey information received from the server computer 135 and/or the driver device 120. The information may be provided by a user interacting with the driver device 120 via user interfaces 200A, 200B, 300, and 400 and may include a report of one or more issues identified to driver device 120 as being associated with a particular vehicle. For example, when a server computer 135 receives an issue notification identifying an issue with an interior or exterior component of a vehicle, a report of the issue identified by the issue notification may be transmitted to the maintenance information device 140. In an embodiment, the driver device 120 may provide both information representative of a certification of operability, such as a driver certification, and information relevant to issues with an interior and/or exterior component of a particular vehicle, such issues identified by an issue notification as set forth above, to the server computer 135.

As previously discussed with respect to FIG. 4, based on an issue notification, the server computer 135 may identify a maintenance action to address the issue then transmit an instruction to the maintenance information device 140 to perform the identified maintenance action. In an embodiment, the server computer 135 may transmit an identification of the particular vehicle along with the maintenance action and/or the issues identified with the particular vehicle to maintenance information device 140, as shown in FIG. 5. For example, the user interface 500 may include a vehicle identification 505 with vehicle information regarding a particular vehicle to ensure that reported issues (e.g., issue notifications) and maintenance actions are associated with the same vehicle. In other words, the vehicle identification number identified through driver device 120 may be the same vehicle identification number provided to the maintenance information device 140 and, thus, the issues identified by the user (e.g., issues with an interior and/or exterior component of the vehicle identified by an issue notification) and/or a maintenance action may be correctly reviewed by the person or people associated with the maintenance of the particular vehicle.

In an embodiment, the user interface 500 may include a representative diagram of a vehicle and one or more issue identification location elements 510, 515, and 520. The one or more issue identification location elements 510, 515, and 520 may be associated with an approximate location of an issue on a vehicle identified via the driver device 120. For example, issue identification location element 510 may be associated with identifier "3" and the listed issue may be indicated by a first issue notification 525 identifying that the belts in the engine compartment need service. Similarly, the issue identification location element 515 may be associated with identifier "2" and the listed issue may be indicated by a second issue notification 530 identifying that an interior light issue exists, with a note that one or more lights will not illuminate. The issue identification location element 520 may be associated with identifier "3" and the listed issue may be indicated by as a third issue notification 535 identifying that a pathway obstruction exists, with a note that a substance is on the floor. As discussed with respect to FIG. 4, location identification information associated with the issue identification location elements 510, 515, 520 may be included in a digital record stored at the server computer 135. The digital record may include an association between the location identification information and the related issue identified via the driver device 120. In an embodiment, the issue notifications 525, 530, 535 may be reviewed by a user via the user interface 500. For example, a maintenance technician may review the first issue notification 525, the second issue notification 530, and the third issue notification 535 using the user interface 500 on the maintenance information device 140.

The user interface 500 may further included one or more interactive elements 540, 545, 550, 555. In an embodiment, a user may interact with an interactive element 540, 545, 550, 555 to indicate whether a particular issue is resolved. For example, a user may interact with interactive element 555 (e.g., a checkbox) to mark that the issue notification 525, 530, 535 aligned with the interactive element 555 has been resolved. In another embodiment, a user may interact with an interactive element 540, 545, 550, 555 to add a note. For example, a user may interact with interactive element 545 (e.g., add note button) to add a note associated with one or more of the issue notifications 525, 530, 535. In another embodiment, a user may interact with an interactive element 540, 545, 550, 555 to certify a resolution to an issue. Specifically, once the issues associated with the issue notifications 525, 530, 535 have been repaired, a user may interact with interactive element 540 (e.g., certified repaired button) to certify that the issues identified with the vehicle have either been properly repaired or that the vehicle is in a safe and serviceable operational condition for use in transporting people or goods. In some embodiments, when a user certifies that the issues have been properly repaired or that the vehicle is safe and operable via the interactive element 540, the maintenance information device 140 may generate a maintenance certification. The maintenance certification may indicate that a vehicle is operable upon receiving the confirmation via maintenance information device 140 that the maintenance of the vehicle is successfully completed. In turn the maintenance certification that the vehicle is operable may then be transmitted to the server computer 135.

The fleet routing system 100 may monitor one or more vehicles within a fleet of vehicles that are serviced and safely operational. The server computer 135 may, for example, receive an indication from a driver device 120 that a particular vehicle is in safe and operable condition by user interaction with the interactive element 435A (e.g., the satisfactory button) after an inspection of the particular vehicle has been performed. Alternatively or additionally, the server computer 135 may receive an indication that an issue exists (e.g., an issue notification identifying an issue with an interior or exterior component of the vehicle) from driver device 120. In turn, a report of the identified issue with the particular vehicle may be transmitted to a maintenance information device 140 from the server computer 135. Once a report of the issue is received from the server computer 135, a maintenance of the vehicle to address the issue identified in the report may be processed by the maintenance information device 140. For example, a report received by a maintenance information device 140 may identify an issue with the break line of a vehicle and, in turn, maintenance of the vehicle to address the issue with the break line may be processed by the maintenance information device 140. Subsequently, as discussed in detail above, a maintenance certification may be generated, the maintenance certification verifying that a particular vehicle is operable upon receiving confirmation that maintenance addressing an issue with an interior and/or exterior component of the vehicle is successfully completed. The maintenance certification may then be transmitted by the maintenance information device 140 to the server computer 135.

In an embodiment, in response to the server computer 135 receiving a driver certification (e.g., a driver certification from the driver device 120) or a maintenance certification (e.g., a maintenance certification from the maintenance information device 140 that a vehicle is safe), the server computer 135 may automatically select the vehicle to perform a particular route service. The vehicle may be identified via a vehicle identification number associated with the vehicle. For example, a bus may be selected from a digital record based on an associated vehicle identification number to perform a particular bus route in response to receiving a driver certification that the bus is operable. In an embodiment, once selected, the vehicle may be assigned to perform the particular route service based on a request received by the server computer 135. For example, a request to transport children to school along a particular bus route may be received by the server computer 135. In turn, a bus selected for the particular bus route may be assigned to perform the bus route service based on the received request. In this manner, the server computer 135 may select vehicles that are safe and certified operable to provide route services. Similarly, in an embodiment, the server computer 135 may also identify vehicles that are not safe or operable and automatically remove those vehicles from service until such time as a maintenance certification is received from a maintenance information device 140 certifying that one or more of those vehicles are safe and operable.

In an embodiment, the server computer 135 may receive both an issue notification and a driver certification associated with the same vehicle. Specifically, the server computer 135 may receive from the driver device 120 both the issue notification identifying an issue with the interior or exterior component of a particular vehicle and a driver certification that the particular vehicle is operable. For example, the server computer 135 may receive an issue notification identifying exterior damage to a side of the bus, but the server computer 135 may receive a driver certification that the bus is operable despite the exterior damage to the side of the bus. In an embodiment, the server computer 135 may the proceed to analyze the issue notification. For example, the issue notification may be analyzed to determine if the identified issue with the interior or exterior component of the vehicle is minor enough to warrant a driver certification that the vehicle is still operable. Based on the analysis, the server computer 135 may override the driver certification or the issue notification. In one embodiment, the server computer 135 may override the issue notification if it is determined that the identified issue with the interior or exterior component is minor enough to warrant a driver certification that the vehicle is operable. As a result, the server computer 135 may proceed to assign the vehicle to perform a particular route service based on a request received by the server computer 135. Alternatively or additionally, the server computer 135 may override the driver certification that the vehicle is operable despite the issue with the interior or exterior component. For example, based on the analysis by the server computer 135, it may be determined that the issue identified by the issue notification warrants maintenance, thus the server computer 135 may override the driver certification. If the driver certification is overridden, the server computer 135 may transmit the report of the issue to a maintenance information device 140. For example, a report of an issue may be transmitted to a maintenance information device 140 at which time the vehicle associated with the issue may be serviced to address the issue. In response to transmitting the report of the issue, a maintenance certification that the vehicle is operable may be received at the server computer 135 from the maintenance information device 140. For example, the server computer 135 may receive a maintenance certification that a bus is operable and an issue related to the bus battery has been addressed. Finally, after receiving the maintenance certification that the vehicle is operable from the maintenance information device 140, the server computer 135 may assign the vehicle to perform a particular route service.

The fleet routing system 100 may further be utilized to identify and address issues among a fleet of vehicles. In an embodiment, the server computer 135 may ascertain that an inadequate number of vehicles are available to provide a particular ride service. Available vehicles may be ascertained based on data (e.g., historic data) stored at the server computer 135 indicating one or more vehicles associated with a current driver certification or maintenance certification. Moreover, vehicles required for a particular ride service may be ascertained based on data received from one or more devices 110, 115, 120, 125, 130, 140, 145 and/or historic data stored at the server computer 135. Based on the availability of vehicles and the vehicles required for a particular rid service, the server computer 135 may ascertain whether or not an adequate number of vehicles are available to provide a particular ride service.

In an embodiment, the server computer 135 may be configured to provide a notification to one or more devices 110, 115, 120, 125, 130, 140, 145 that a service issue may exist with one or more vehicles. For example, a notification may be sent to a provider device 130 indicating that three buses have issues requiring maintenance. By sending such notifications, users of the one or more devices 110, 115, 120, 125, 130, 140, 145 can be provided with enough notice to identify or provide additional vehicles to ensure that a route service is not interrupted. For example, when a provider is notified via a provider device 130 that three buses have issues requiring maintenance, the provider may proceed with procuring replacement vehicles to service the route the three buses were previously assigned to. In another embodiment, as discussed in detail above, the server computer 135 may further maintain a digital record of one or more notifications or reports associated with one or more driver devices 120. The digital records may, in turn, be analyzed to identify repeating issues for a more detailed review of an issue that repeats over time. For example, analysis of the digital record may identify that buses traveling on a particular route require tire maintenance more often than buses traveling on different routes.

Figure 6:
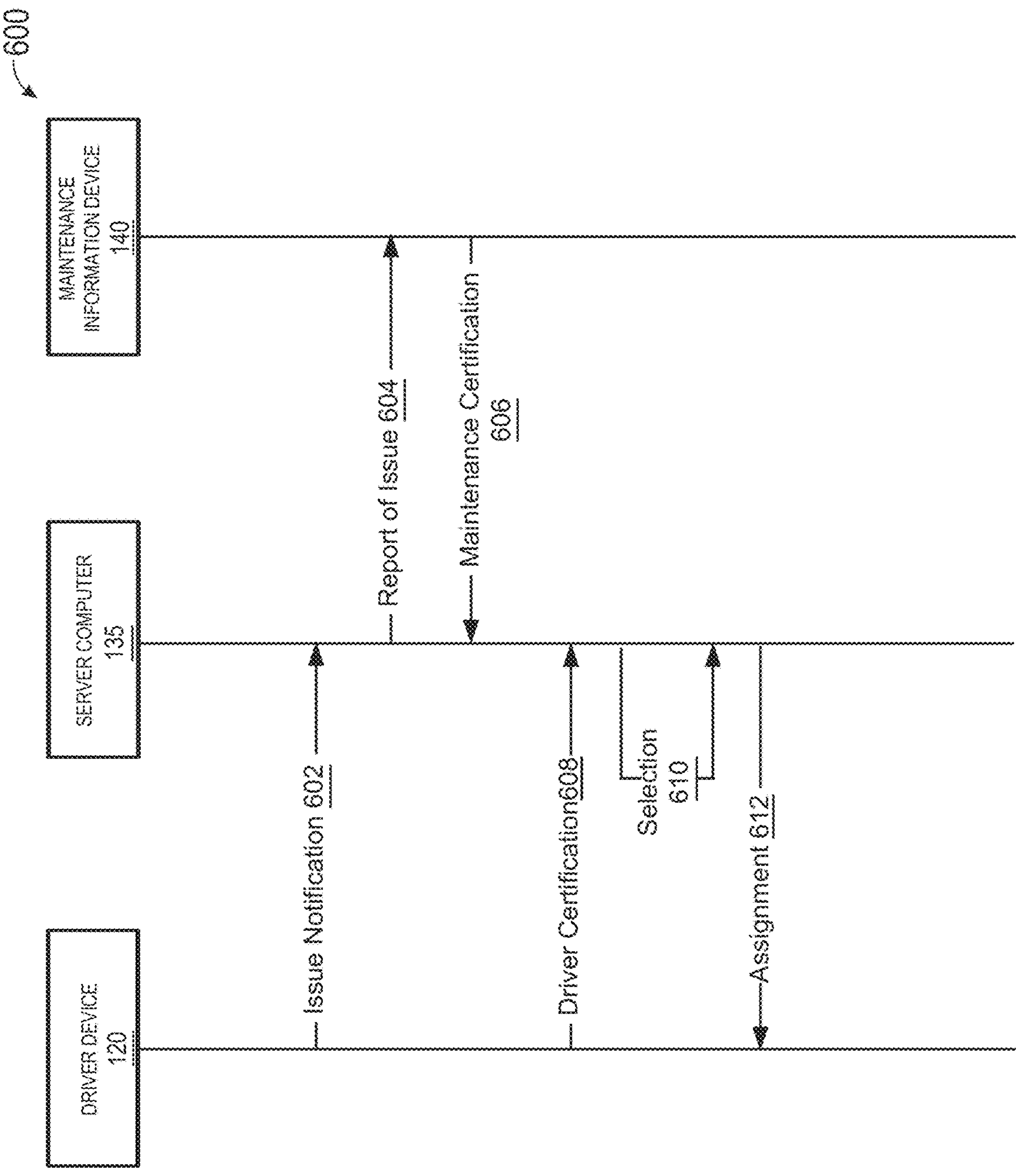
FIG. 6 illustrates an example of a process for providing a maintenance component within the fleet routing system, according to various embodiments.

FIG. 6 illustrates an example of a process 600 for providing a maintenance component within the fleet routing system 100, according to various embodiments. Some or all of the process 600 (or any other process described herein, or variations and/or combinations thereof) may be performed under the control of one or more computer systems (e.g., a driver device 120, a server computer 135, a maintenance information device 140, etc.) comprising one or more processors and memory storing a set of instructions that, when executed by the one or more processor, cause the one or more processors to execute a series of instructions and/or code (e.g., executable instructions, one or more computer programs, one or more applications, etc.). In an embodiment, the process 600 of FIG. 6 may be performed by at least a driver device 120, a server computer 135, and a maintenance information device 140. The code may be stored on a computer-readable storage medium, for example, in the form of a computer program including a plurality of instructions executable by one or more processors. The computer-readable storage medium may be non-transitory.

The process 600 may begin at 602 where one or more vehicle inspection results including an issue notification are transmitted from the driver device 120 to the server computer 135. The one or more vehicle inspection results may be associated with one or more vehicles among a fleet of vehicles. In an embodiment, the vehicles comprising a fleet of vehicles may be of similar vehicle types. Alternatively, the vehicles comprising the fleet of vehicles may be of differing vehicle types. For example, a fleet of vehicles may include trucks, sedans, and/or buses. The issue notification may identify an issue with an interior or exterior component of a vehicle associated with the one or more vehicle inspection results.

In an embodiment, when the issue notification is received at the server computer 135, a report of the issue may be transmitted to a maintenance information device 140 at 604. The report of the issue may include information such as identification of an issue with an interior or exterior component of a vehicle, location identification information for the issue identified, identification of the vehicle associated with the issue, and/or any other information associated with the issue.

In an embodiment, the maintenance information device 140 may receive, from the server computer 135, the report of the issue at 604 and the maintenance information device 140 may process maintenance of the vehicle to address the issue identified in the report. For example, the issue report may identify low tire pressure on a bus and, in turn, the maintenance information device 140 may process maintenance of the bus to address the low tire pressure. In another embodiment, the server computer 135 may identify a particular maintenance action to address the identified issue with the interior or exterior component of the vehicle and, in addition to the issue report, transmit an instruction to the maintenance information device 140 to perform the maintenance action. Similarly, the maintenance information device 140 may process the maintenance action to address the issue identified in the report.

In an embodiment, upon receiving confirmation that maintenance of a vehicle is successfully completed, the maintenance information device 140 may generate a maintenance certification that the vehicle is operable. In turn, at 606, the maintenance certification that the vehicle is operable may be transmitted form the maintenance information device 140 to the server computer 135.

Alternatively and/or additionally, the process 600 may begin or proceed at 608 where one or more vehicle inspection results including a driver certification are transmitted from the driver device 120 to the server computer 135. The driver certification may certify that the vehicle associated with the vehicle inspection results is operable. In an embodiment, the driver certification may additionally include an electronic signature of a user of the driver device 120. The electronic signature may further certify that the vehicle associated with the vehicle inspection results is operable. For example, a bus driver may use the driver device 120 to certify via a signature that a bus is operable and, as a result, a driver certification associated with said bus may be transmitted to the server computer 135.

In an embodiment, the process may proceed to 610 where, in response to receiving either the driver certification or the maintenance certification, the vehicle may be automatically selected for a particular route service. For example, a bus may be automatically selected by the server computer 135 for a bus route service in response to receiving a driver certification of the bus's operability.

In an embodiment, a request may be received by the server computer 135 from one or more devices 110, 115, 120, 125, 130, 140, 145 and, based on the received request, the server computer 135 may assign the vehicle to perform the particular route service. For example, a request for a vehicle to pick up children at a school may be received by the server compute 135 from a provider device 130. Previously, a bus may have been automatically selected for a bus route service in response to the server computer 135 receiving a driver certification associated with the bus. Thus, based on the request for a vehicle to pick up children at a school, the server computer 135 may assign the bus to perform the bus route service to pick up the children at school.

By utilizing the fleet routing system 100 using the techniques described herein, a more efficient and accurate method of managing fleet logistics for a fleet of vehicles may be provided. For instance, a driver device 120 may be implemented to complete standard inspections of vehicles in a fleet on a regular or irregular basis. In turn, vehicles with immediate maintenance needs may be identified and handled by a server computer 135 and/or a maintenance information device 140, while vehicles that are deemed safe and operable may continue to perform route services. In this way, vehicles of a fleet can continuously be tracked and maintained without improperly removing a vehicle from routing services or continuing to use a vehicle requiring maintenance. As a result, significant stress may be removed from fleet logistics and potential customers are less likely to be left without services.

The foregoing description has been presented for the purposes of illustration and description. It is not intended to be exhaustive or to limit the disclosure to the precise form disclosed. Many modifications and variations are possible in light of the above disclosure and teachings. Further, it should be noted that any or all of the aforementioned alternate implementations may be used in any combination desired to form additional hybrid implementations of the disclosure. For example, components described herein may be removed and other components added without departing from the scope or spirit of the embodiments disclosed herein or the appended claims.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system, comprising:

a server computer comprising a first processor and a first memory storing a first set of instructions that, when executed by the first processor, cause the first processor to perform steps comprising:

receiving, from a driver device, one or more vehicle inspection results for a vehicle among a fleet of vehicles, wherein the one or more vehicle inspection results include at least one of:

an issue notification identifying an issue with an interior or exterior component of the vehicle, or a driver certification that the vehicle is operable; and when the issue notification is received:

transmitting a report of the issue to a maintenance information device;

receiving, in response to transmitting the report of the issue, a maintenance certification that the vehicle is operable from the maintenance information device;

in response to receiving the driver certification or the maintenance certification:

automatically selecting the vehicle for a particular route service, and assigning the vehicle to perform the particular route service based on a request received by the server computer.

2. The system of claim 1, wherein the first set of instructions, when executed by the first processor, cause the first processor to perform steps further comprising:

identifying an inspection checklist for the vehicle;

retrieving the inspection checklist from a database; and transmitting the inspection checklist to the driver device.

3. The system of claim 2, wherein the inspection checklist further provides at least a first interactive element to identify the interior or exterior component is in satisfactory condition, and a second interactive element to report the issue with the interior or exterior component.

4. The system of claim 1, wherein the first set of instructions, when executed by the first processor, cause the first processor to perform steps further comprising:

storing a digital record of one or more notifications or reports associated with the driver device for a predetermined amount of time.

5. The system of claim 4, wherein an entry on the digital record includes location identification information for the issue identified via the driver device.

6. The system of claim 1, wherein at least a portion of the one or more vehicle inspection results are retrieved from a vehicle device coupled to the vehicle via a communication link between the driver device and the vehicle device.

7. The system of claim 1, further comprising:
the driver device comprising a second processor and a second memory storing a second set of instructions that, when executed by the second processor, cause the second processor to perform steps comprising:
establishing a communication link with a vehicle device associated with the vehicle; and
receiving, from the vehicle device, status information about the vehicle over the communication link.

8. The system of claim 7, wherein the status information about the vehicle further includes a unique identification of the vehicle.

9. The system of claim 1, wherein the first set of instructions, when executed by the first processor, cause the first processor to perform steps further comprising:
identifying a maintenance action to address the issue with the interior or exterior component of the vehicle; and
transmitting an instruction to the maintenance information device to perform the maintenance action.

10. The system of claim 1, further comprising:
the maintenance information device comprising a third processor and a third memory storing a third set of instructions that, when executed by the third processor, cause the third processor to perform steps comprising:
receiving, from the server computer, the report of the issue;
processing a maintenance of the vehicle to address the issue identified in the report;
generating the maintenance certification that the vehicle is operable upon receiving confirmation that the maintenance is successfully completed; and
transmitting, to the server computer, the maintenance certification that the vehicle is operable.

11. A method comprising:
receiving, by a server computer from a driver device, one or more vehicle inspection results for a vehicle among a fleet of vehicles, wherein the one or more vehicle inspection results include at least one of:
an issue notification identifying an issue with an interior or exterior component of the vehicle, or
a driver certification that the vehicle is operable; and
when the issue notification is received:
transmitting, by the server computer, a report of the issue to a maintenance information device;
receiving, by the server computer in response to transmitting the report of the issue, a maintenance certification that the vehicle is operable from the maintenance information device;
in response to receiving the driver certification or the maintenance certification:
automatically selecting, by the server computer, the vehicle for a particular route service, and
assigning, by the server computer, the vehicle to perform the particular route service based on a request received by the server computer.

12. The method of claim 11, further comprising:
identifying, by the server computer, an inspection checklist for the vehicle;
retrieving, by the server computer, the inspection checklist from a database; and
transmitting, by the server computer, the inspection checklist to the driver device.

13. The method of claim 12, wherein the inspection checklist further provides at least a first interactive element to identify the interior or exterior component is in satisfactory condition, and a second interactive element to report the issue with the interior or exterior component.

14. The method of claim 11, further comprising:
storing, by the server computer, a digital record of one or more notifications or reports associated with the driver device for a predetermined amount of time.

15. The method of claim 14, wherein an entry on the digital record includes location identification information for the issue identified via the driver device.

16. The method of claim 11, wherein at least a portion of the one or more vehicle inspection results are retrieved from a vehicle device coupled to the vehicle via a communication link between the driver device and the vehicle device.

17. The method of claim 11, wherein the driver device establishes a communication link with a vehicle device associated with the vehicle, and retrieves status information about the vehicle over the communication link.

18. The method of claim 17, wherein the status information about the vehicle further includes a unique identification of the vehicle.

19. The method of claim 11, further comprising:
receiving, by the server computer from the driver device, both the issue notification identifying the issue with the interior or exterior component of the vehicle, and the driver certification that the vehicle is operable despite the issue with the interior or exterior 4 component;
analyzing, by the server computer, the issue notification;
overriding, by the server computer, the driver certification that the vehicle is operable despite the issue with the interior or exterior component;
transmitting, by the server computer, the report of the issue to the maintenance information device; and
assigning, by the server computer, the vehicle to perform the particular route service after receiving the maintenance certification that the vehicle is operable from the maintenance information device.

20. The method of claim 11, further comprising:
identifying, by the server computer, a maintenance action to address the issue with the interior or exterior component of the vehicle; and
transmitting, by the server computer, an instruction to the maintenance information device to perform the maintenance action.

* * * * *